United States Patent
Bogue et al.

[11] Patent Number: 5,939,120
[45] Date of Patent: Aug. 17, 1999

[54] EXTERNALLY HEATED MATERIAL PROCESSING APPARATUS AND METHOD

[75] Inventors: B. Arlie Bogue, Broad Run; Steven E. Frisbee, Reston; William F. Rutkowski, Arlington, all of Va.

[73] Assignee: Fuisz Technologies Ltd., Chantilly, Va.

[21] Appl. No.: 08/966,228

[22] Filed: Nov. 7, 1997

[51] Int. Cl.⁶ .................................. A23G 7/00; A23P 1/00
[52] U.S. Cl. .................... 426/465; 99/481; 219/386; 264/8; 366/146; 425/9; 426/517; 426/658
[58] Field of Search .................... 426/465, 517, 426/519, 658; 99/348, 481, 451; 219/386, 429; 425/9; 264/8; 366/146

[56] References Cited

U.S. PATENT DOCUMENTS

| | | | |
|---|---|---|---|
| 1,489,342 | 4/1924 | Brent | 425/9 |
| 3,070,045 | 12/1962 | Bowe | 425/9 |
| 3,073,262 | 1/1963 | Bowe | 425/9 |
| 3,856,443 | 12/1974 | Salvi | 425/9 |
| 3,930,043 | 12/1975 | Warning et al. | 426/515 |
| 4,501,538 | 2/1985 | Bray et al. | 219/386 |
| 4,793,782 | 12/1988 | Sullivan | 425/9 |
| 4,855,326 | 8/1989 | Fuisz | 514/777 |
| 4,872,821 | 10/1989 | Weiss | 425/9 |
| 5,279,849 | 1/1994 | Fuisz et al. | 426/658 |
| 5,387,431 | 2/1995 | Fuisz | 426/658 |
| 5,427,811 | 6/1995 | Fuisz et al. | 426/465 |
| 5,441,754 | 8/1995 | Evan, Sr. | 99/483 |
| 5,445,769 | 8/1995 | Rutkowski et al. | 264/8 |
| 5,447,423 | 9/1995 | Fuisz et al. | 425/9 |
| 5,458,823 | 10/1995 | Perkins et al. | 264/8 |

*Primary Examiner*—George Yeung
*Attorney, Agent, or Firm*—John F. Levis

[57] ABSTRACT

A material processing apparatus and method for processing a solid feedstock material through a melt spin process including a spinner head having a spinner head chamber defined by a parametrical processing wall through which the solid feedstock material is processed. The apparatus includes a device for rotating the spinner head about an axis of rotation to cause the feedstock material to be repelled towards and through the processing walls. A heating source separate from and exterior to the spinner head is included for heating the feedstock material to an elevated temperature to cause the melt spin processing as the feedstock material is projected through the processing wall.

25 Claims, 11 Drawing Sheets

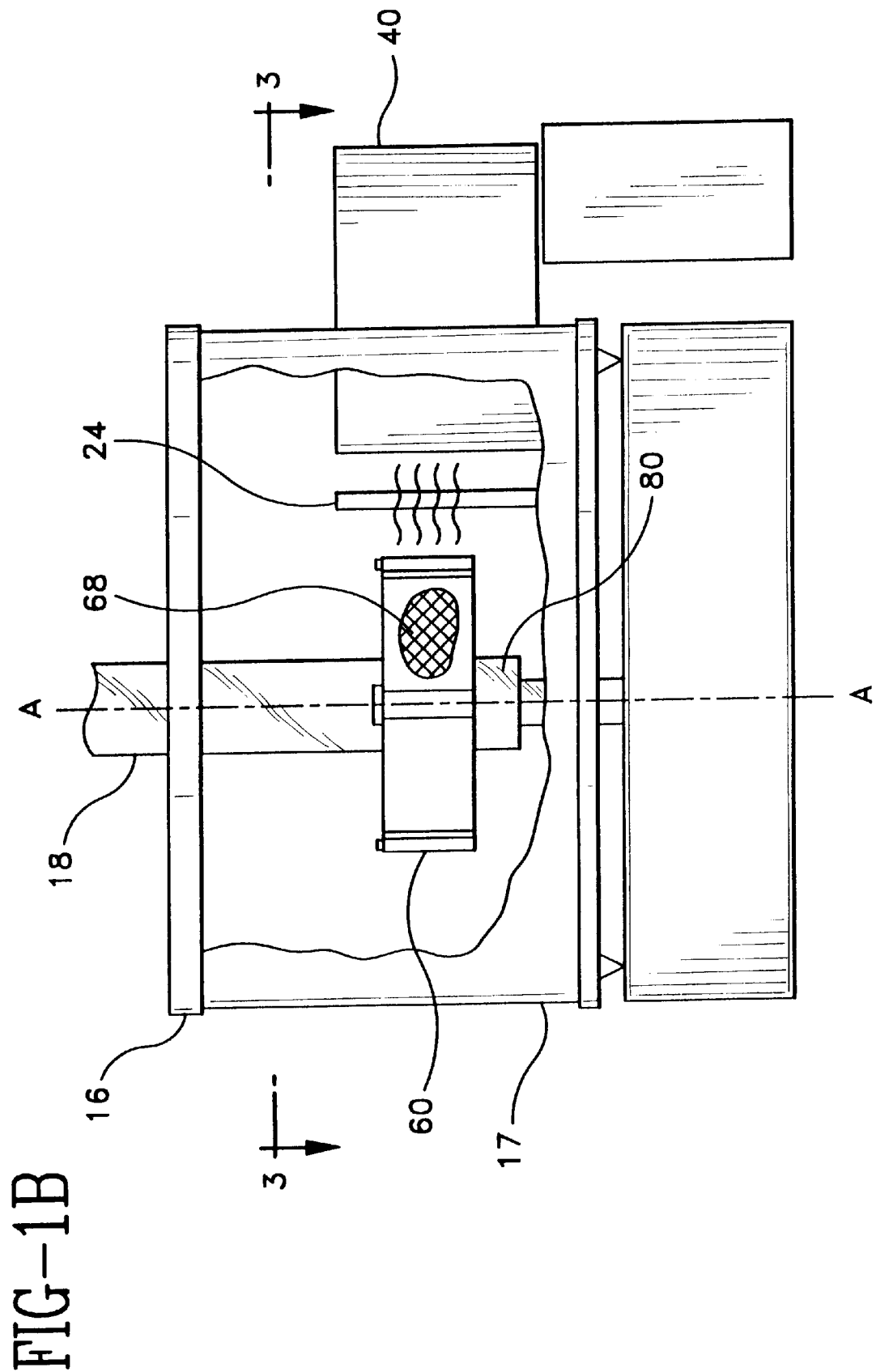

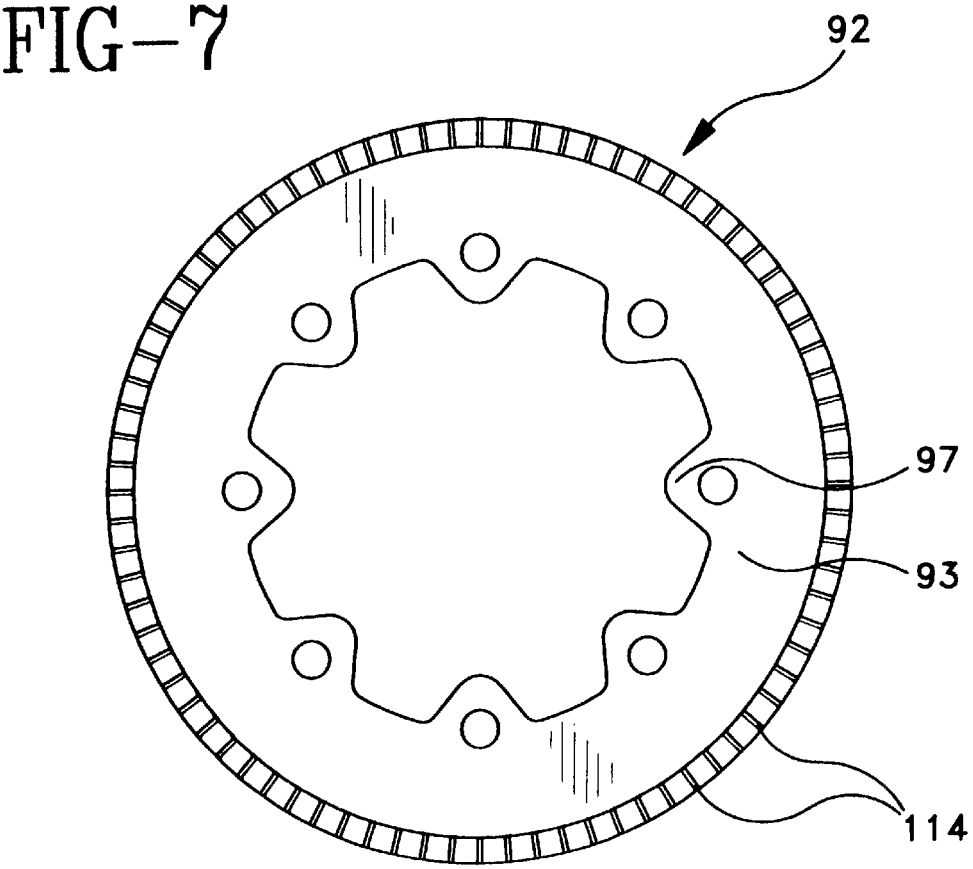
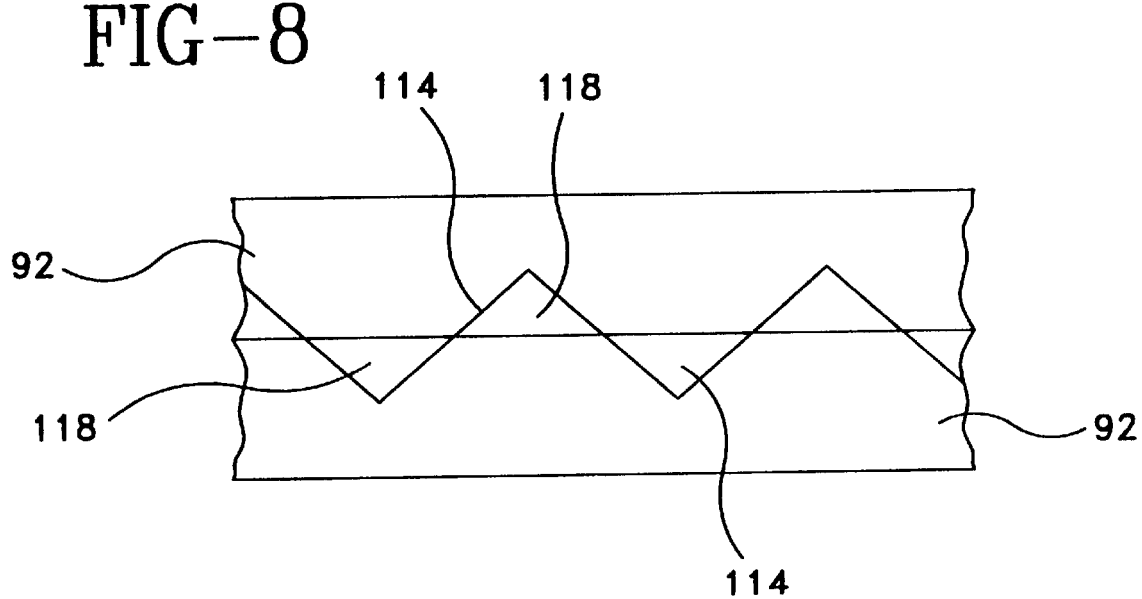

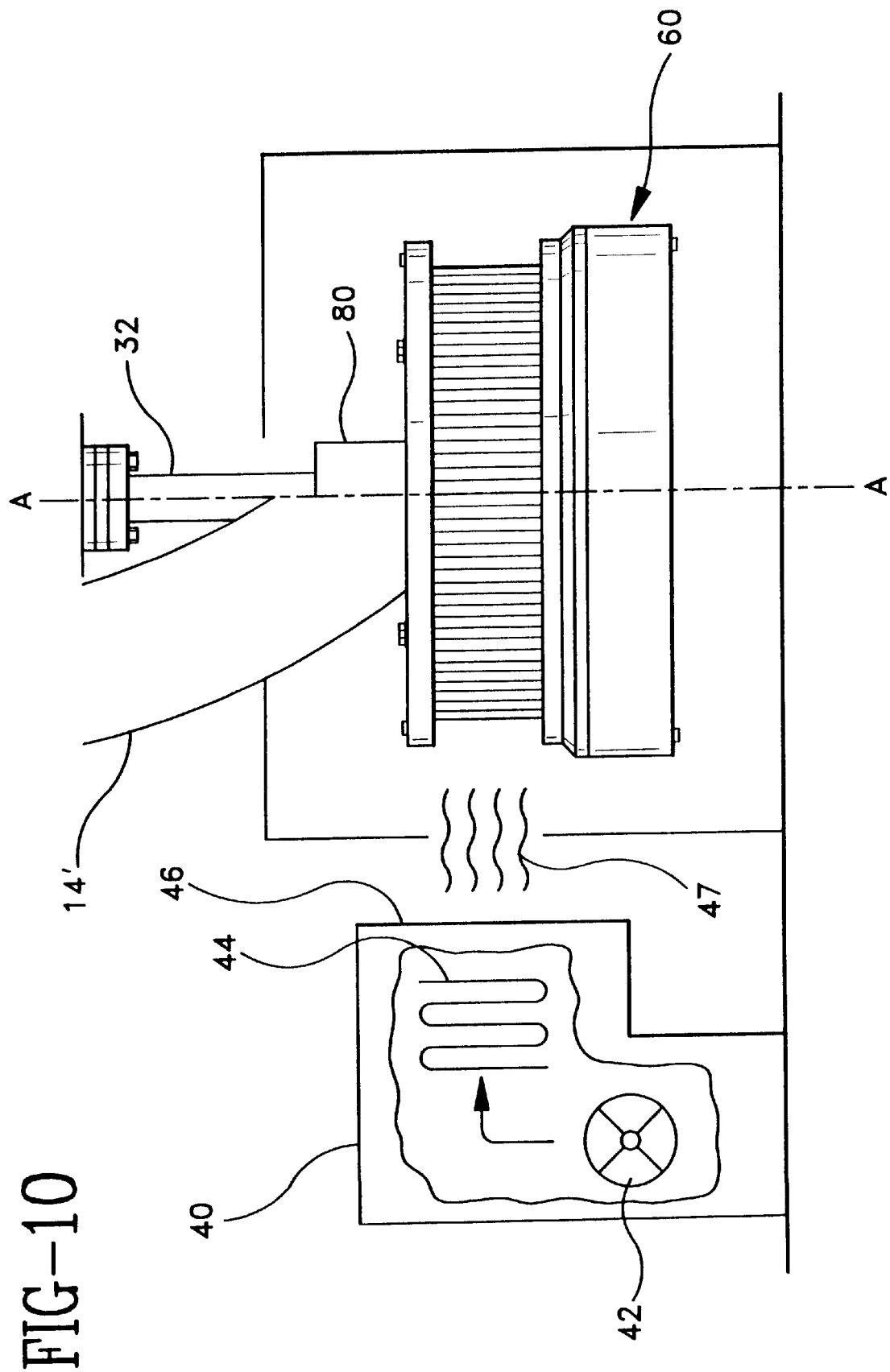

EXTERNALLY HEATED MATERIAL PROCESSING APPARATUS AND METHOD

BACKGROUND OF THE INVENTION

The present invention relates generally to an apparatus and method for heating and spinning feedstock materials. More particularly, the present invention relates to an improved apparatus and method for heating and spinning solid, non-solubilized feedstock material capable of undergoing intraparticle flow with the application of heat and force such as corn syrup solids, sucrose, polymers and the like where the heating of such materials is external to a spinning apparatus.

Various machines have been devised for the melting and spinning of meltable materials, especially sugar through a "melt spin" process. A particularized form of the melt spin process is known as flash flow processing. This process is described in U.S. Pat. Nos. 4,855,326; 5,279,849 and 5,387,431 all of which are incorporated herein by reference. The feedstock material may be introduced into a spinning head of the spinning machine in solid form. The material is subjected to heat therein just prior to being spun out from the spinner head where it reforms and solidifies in the air.

Typical cotton candy spinning machines operate by a melt spin process and include a spinner head having a generally cylindrical apertured wall. Sugar in solid form, is introduced into the spinner head where it is melted. Spinning of the spinner head causes the melted sugar to be spun out through the apertures in the cylindrical wall where it solidifies into a floss-like structure which has become to be known as cotton candy. The characteristic shape and consistency of the spun material is influenced by several factors. These factors include the size and construction of the spinner head, the size, arrangement and location of the apertures in the cylindrical wall of the spinner head, as well as the manner in which heat is applied to the spinner head.

Numerous machines, designed specifically for spinning cotton candy, have employed various modifications of the spinner head construction in an effort to yield spun product.

U.S. Pat. No. 4,872,821 discloses a cotton candy spinning machine including a spinner head having stacked, slotted, cylindrical walls and coiled heating elements adjacent each wall. Sugar in solid form is introduced into the spinner head and propelled against the heating elements where it is melted. The molten sugar is spun out through the slots where it solidifies into the floss-like material known as cotton candy.

U.S. Pat. No. 3,930,043 discloses a machine which includes a helical resistance heating element positioned within a finely perforated shell. The heating element is supported against the inner wall of the shell by spacer elements. As the shell spins, molten sugar is extruded through the perforations. Similar machines are disclosed in U.S. Pat. Nos. 3,073,262 and 3,070,045.

U.S. Pat. No. 3,856,443 discloses another type of spinning machine wherein the perforated shell through which sugar is extruded functions as the resistance element of the heating means.

U.S. Pat. No. 1,489,342 discloses a spinner head having an annular heating element formed of a strip of electrical resistance material. The strip is bent as a flat spiral structure forming slanted stretches of heating element having narrow slots between them. The heating element melts the sugar which then passes through the slots between the stretches of the heating element and out through an apertured shell positioned thereabout.

While some of the above described machinery may perform satisfactorily for converting granular sugar into a floss-like material in the formation of cotton candy, it does not function entirely satisfactorily for spinning other materials which may have properties quite dissimilar to sugar or for other materials mixed with sugar, or for liquiflash processing. Nor does the above-described machinery have the capacity to yield product having a desired shape and size. In recent years, it has been increasingly desirable to spin not only feedstock such as sugar and materials combined with sugar, but also non-saccharides.

Attempts have been made to eliminate undesirable drawbacks of conventional machinery especially with regard to the spinning of feedstock including non-sugars as well as sugars combined with non-sugars, is shown and described in U.S. Pat. No. 5,427,811, which is incorporated by reference herein. The spinner head described therein is referred to as a "cable head" spinner. The cylindrical wall of the spinner head is formed by a heating element comprising a cable which is helically wound about the axis of rotation of the spinner head. In this way the heating element itself is used as the wall of the spinner head through which the material is ejected. U.S. Pat. No. 5,458,823, which is also incorporated by reference herein, attempts to solve the problem of non-uniform heating of the feedstock by incorporating discrete closely spaced elongate heating elements. The elements are peripherally spaced about the spinner head and may be individually heated in order to control the morphology of the of the expelled material.

All previously designed spinner heads for producing a spun product through a melt spin process, including flash flow and liquiflash processing have contained heaters built into the head. Such designs require considerable head mass for heater enclosure resulting in the loss of surface area for expelled product. In addition, power must be supplied to the rotating heaters. These requirements present significant obstacles to the scale up and production of larger and faster heads for both bead and floss production.

Many prior art spinner heads including the cable head utilize electrical resistance coils located on the spinning head in order to heat the material. Such head based heating sources limit the ability to focus the heat to the outermost surface of the head. The elements have a certain thickness over which the material must pass prior to expulsion. In addition the coils tend to heat the entire wall through conduction even if the coils are mounted on the wall's outer surface. This creates a heated flow path that may over heat the material leading to agglomeration.

In addition, many other problems and limitations arise in supplying electrical current to the rotating spinner head. Typically, current is supplied to rotating devices using a set of contacts or brushes located on the rotating device which frictionally engage a stationary ring to which power is supplied. Use of these components adds a extra degree of complexity to the head and present certain limitations.

The components, especially the contacts, have a finite working life after which they must be replaced. The contacts' life expectancy is inversely proportional to the amount of current carried therethrough. This presents a limitation to increasing the size of the spinning head since larger heads require more power, and therefore, more current. It is desirable to increase the spinner head size in order to both increase the yield of reformed product per head as well as to produce certain reformed morphologies. Large spinner heads, however, have previously not been feasible to employ due in part to the high maintenance cost associated with the low life cycles of the contacts. Furthermore, the life expectancy of the contacts is inversely proportional to the rotational velocity of the head due to the frictional engagement of the current transmitting components. Therefore, in order to maintain reasonable life expectancies the rotational velocity must be limited. This too limits the yield per head and morphologies that can be produced.

Additionally, the shape of the wall is very important in determining the morphology of the reformed product. It is desirable, therefore, to have as much design flexibility in the wall in order to create a variety of morphologies. As previously stated, incorporating a heating means such as heating elements or coils into the wall places constraints on the design of the processing wall, thereby limiting the variety of morphologies which can be produced. Head mounted heater coils also reduce the surface area that is available for exit points from which material may be expelled.

Another disadvantage of spinner head mounted heating means is the increased weight it encompasses. The heavier the head the more substantial the support and mounting means that are required to support the rotating load. In addition, the increased weight and complexity of the head mounted heating device increases the likelihood that the head will not be rotationally balanced. If the head is not rotationally balanced the loading on the supports will shift with every revolution resulting in vibration. These vibrations present a problem since they subject the support means, such as the shafts and bearings to stresses, thereby decreasing the service life of the material processing system.

In that regard, a need clearly exists for spinning machinery which provides the user with a means of heating the feedstock material without the limitations inherent in the use of heating coils located on the spinner head.

SUMMARY OF THE INVENTION

The present invention provides an improved apparatus and method for the flash flow and liquiflash processing of solid feedstock materials. The present invention provides a spinner head including a spinner head chamber defined by a perimetrical processing wall through which the solid feedstock material is processed. A device for rotating the spinner head about an axis of rotation is also provided to cause the feedstock material to be propelled toward and through the processing wall. A heating device is further provided which is separate from and exterior to the spinner head for heating the feedstock material to an elevated temperature to cause the processing as the feedstock material is projected against the processing wall.

The present invention further provides a spinner head which includes a base and a cover positioned over the base. A peripheral processing wall having a pattern of openings extends between the base and the cover. The processing wall may be formed by a plurality of substantially concentrically stacked rings, each of the rings having a plurality of radially extending grooves through which the feedstock may flow. The processing wall may have a varying diameter with the diameter diminishing as the wall extends axially away from an axial centerline. In addition, each ring may have a radial outer portion including a first lip and a second lip, with the first lip extending radially outwardly further than the second lip and wherein each of the rings is positioned such that the first lip is positioned toward the axial centerline. The spinner head is rotated about an axis of rotation to cause the feedstock material to be propelled toward and through gaps in the processing wall.

The present invention still further provides a method of processing feedstock material comprising the steps of providing a spinner head having a chamber bounded by a material processing wall through which the material is processed and introducing the feedstock material into the chamber. The head is then spun to propel the feedstock material toward and through the processing wall. The feedstock material is heated by a heating device disposed external to the spinner head to an elevated temperature sufficient to cause processing of the material at the processing wall. The processing wall may be heated as the feedstock material is forced toward and through the processing wall. Alternatively the material itself may be heated prior to the feedstock material contacting the processing wall.

As a result of the present invention, the spinner head need not be incorporated with the heating device, thereby providing several advantages. The processing wall may be formed in a variety of shapes and from a variety of materials since the need to incorporated a heating device is no longer required.

Another advantage of the present invention is the availability of the entire surface area of the processing wall to include exit points from which the material can be expelled.

A further advantage of the present invention is the ability to control the temperature of the flow path in order to achieve a desired morphology.

Yet a further advantage of the present invention is the reduction of weight and complexity of the spinner head thereby increasing the design flexibility with respect to the means for supporting the rotating head.

Still a further advantage of the present invention is ability to increase both the size and angular velocity of the spinner head since power no longer must be supplied to the head by contacts and rings.

It is to be understood that the apparatus and method of the present invention can be employed to form particles which are microspheres of a very narrow size range or fibrous floss type material or particles of a shape somewhat in between these extremes. By careful control of conditions, the apparatus of the present invention can be utilized to form particles of a predetermined shape. Conditions which must be controlled include: the heat necessary to bring a feedstock to an internal flow condition, the viscosity of the flowing feedstock; the centrifugal force necessary to move the flowing feedstock to the resistance of an ambient atmosphere which will subdivide the feedstock into particles; the temperature and relative flow of the atmosphere into which the molten feedstock is delivered for subdivision; and the distance needed in relation to the ambient atmosphere so that the expelled feedstock can virtually resolidify in the desired shape.

One skilled in the art can select a material to be processed according to the present invention. Guided by the heat and centrifugal force necessary to bring the selected feedstock under the proper conditions, the appropriate size and shape of the exit orifices in relation to the ambient atmosphere can be selected so as to virtually yield microspheres, floss or particle shapes somewhere in between.

BRIEF DESCRIPTION OF THE DRAWINGS

FIG. 1B is a partial cutaway view of FIG. 1A showing a spinner head located within the interior of the basin;

FIG. 7 is a top plan view of a ring of FIG. 6;

FIG. 8 is a detail view of a portion of the processing wall of FIG. 7;

FIG. 10 is a partial cutaway view showing an alternative embodiment of an external heat source.

DETAILED DESCRIPTION OF THE PREFERRED EMBODIMENTS

The present invention contemplates producing material through a flash heat and liquiflash spin process. More specifically, the present invention contemplates subjecting solid, non-solubilized feedstock material (feedstock) which is capable of undergoing intraparticle flash flow processing or liquiflash processing to a heat sufficient to cause the material to deform or liquefy and pass through an opening under force. The force used in the present invention is centrifugal force provided by a spinner head from which the feedstock material is expelled at a high speed. Preferably no external force is imposed upon the feedstock material after it has been expelled from the spinner head other than resistance provided by ambient atmosphere. The feedstock material so expelled instantly reforms as a solid having a changed morphology as a result of the material being expelled from the spinner head. The application of heat of this invention is unique in that it is externally located separate and apart from the spinner head thereby eliminating the complexities and design limitations inherent with head based heating apparatus. By controlling the amount and location of heat applied to the spinner head and/or the material itself as well as the openings through which the melted product is expelled, the present invention provides the ability to control the morphology of the material expelled from the spinner head.

As the feedstock material comes in contact with the heated wall the material deforms or liquefies enabling it to undergo intraparticle flash flow processing. This process is described in U.S. Pat. Nos. 4,855,326; 5,279,849 and 5,387,431. Liquiflash processing is the subject of co-owned U.S. patent application Ser. No. 08/330,412, now U.S. Pat. No. 5,683,720, the contents of which are hereby incorporated by reference.

Figure 1A:
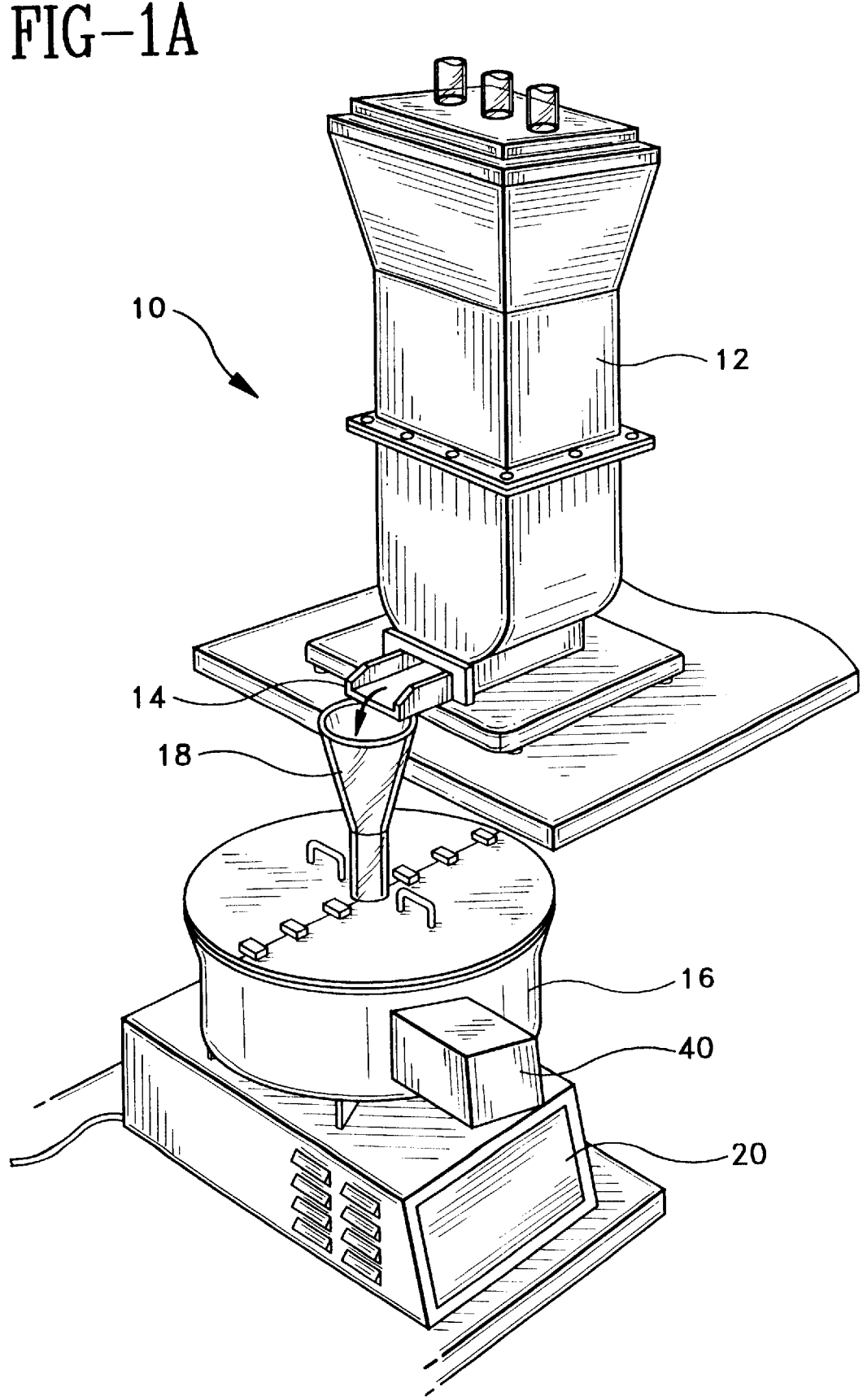
FIG. 1A is a perspective view of a material processing apparatus for feeding, spinning and collecting spun materials.

Referring now to the drawings, FIG. 1A shows a material processing system 10 consisting of a hopper 12, a chute 14, a basin 16, a spinner head 60, shown in FIG. 1B, positioned within basin 16, a funnel 18 for directing material from the chute 14 to the spinner head, an external heating source 40 in the path of the material, and a base 20. The base contains a motor (not shown) for driving the spinner head in a manner as described in U.S. Pat. No. 4,872,821, which is incorporated herein by reference.

Figure 2A:
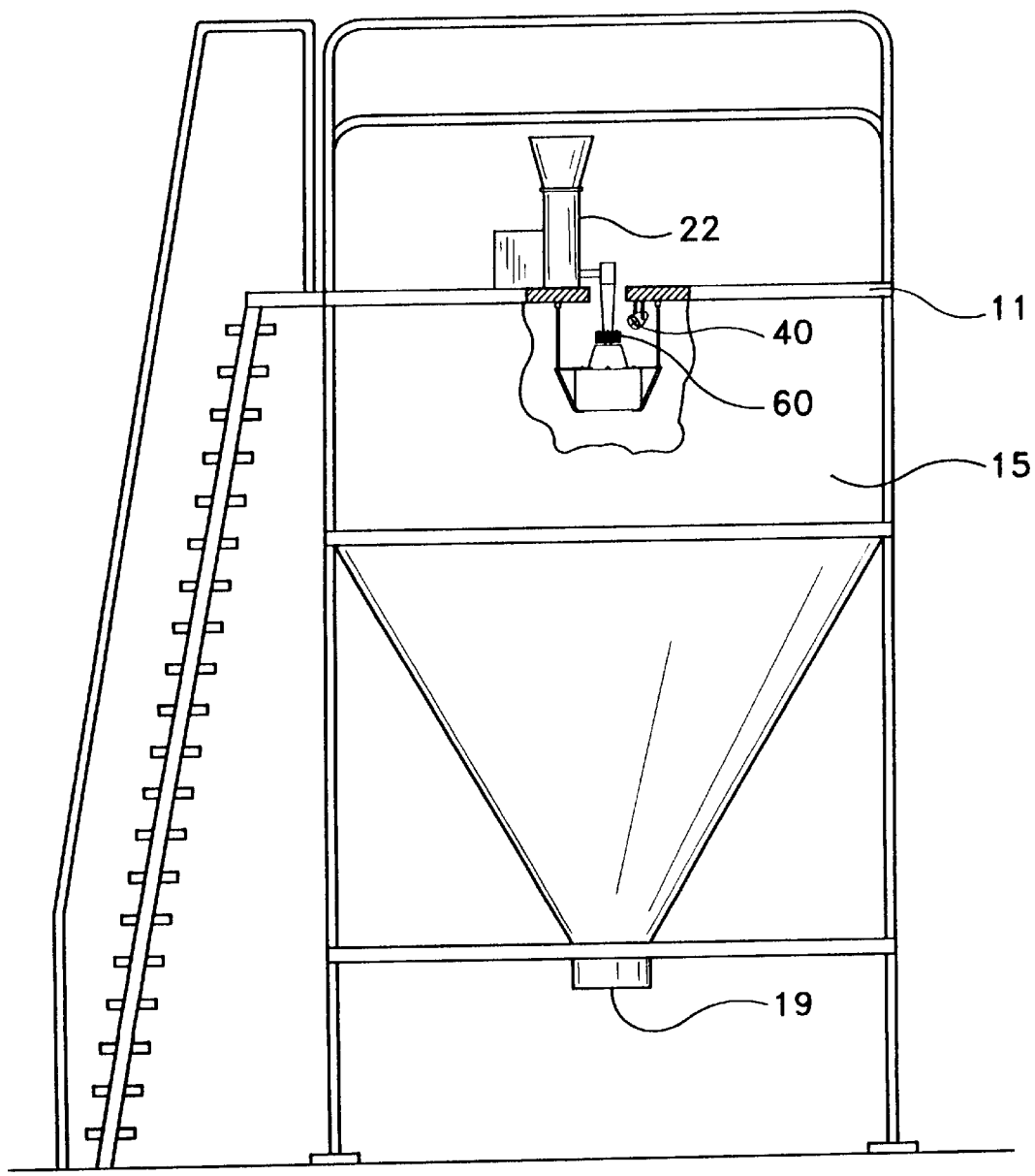
FIG. 2A is an alternative embodiment of a material processing apparatus of the present invention.
Figure 2B:
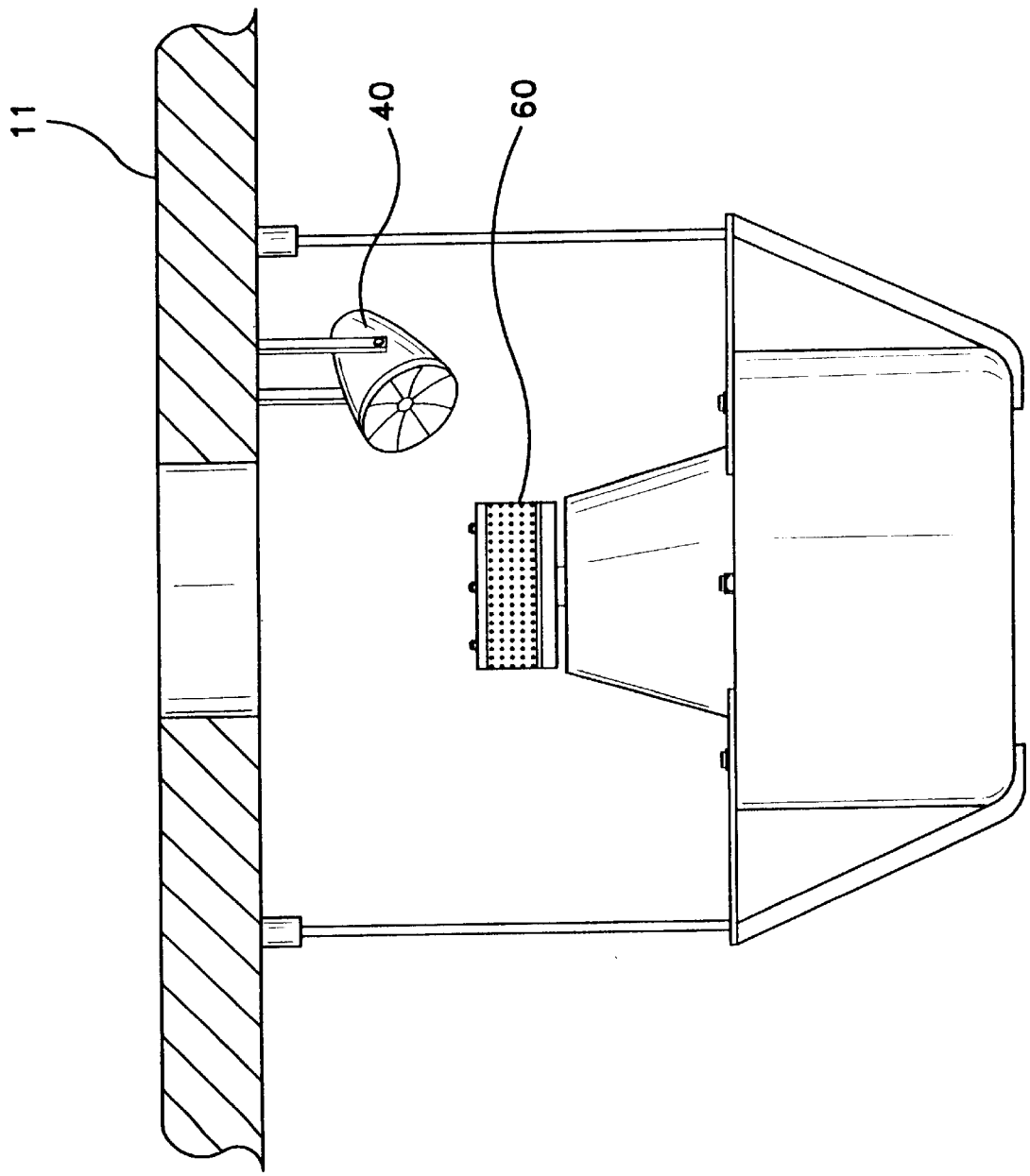
FIG. 2B is a detail view of the spinner head assembly of FIG. 2A.

An alternative embodiment of the material processing system is shown in FIGS. 2A and 2B. The processing system shown may accommodate mass production of spun material. A spinner head 60 is suspended from a platform 11 over a collection bin 15. Collection bin 15 includes an output opening 19 through which the processed material may be removed from the collector to some form of conveyor. A volumetric material feed 22 is disposed above the platform and is in communication with spinner head 60 to convey a supply of material thereto. An external heating source 40 is further provided and may be suspended from platform 11 in spaced proximity to spinner head 60.

A spinner head suitable for flash flow processing in conjunction with an external heating source will now be described. Spinner head 60 shown in FIG. 4 includes a base 62, a cover 64 and a bottom plate 63 all of which are substantially annularly shaped. The base 62, cover 64 and bottom plate 63 may be formed from stainless steel or other suitable material. Cover 64 includes an opening 66 through which the feedstock material may be introduced into the spinner head. Spinner head 60 further includes a substantially cylindrical perimetrical processing wall 68 having an inner surface 70 and an outer surface 72. Wall 68 is disposed between bottom plate 63 and cover 64 forming a chamber 74 for flash flow processing. The wall 68 may be heated by the external heat source 40 to a temperature sufficient for flash flow processing. The wall 68 has a pattern of openings 69 passing therethrough to allow the feedstock material to be expelled.

Head 60 may also include a cover insulating ring 58 and a base insulating ring 56. Base insulating ring 56 is disposed between wall 68 and base 62, and cover insulating ring 58 is disposed between cover 64 and wall 68. Cover insulating ring 58 includes an opening concentric with cover opening 66 to allow for the introduction of feedstock. The insulating rings 56,58 are preferably made from a ceramic material or coated with a heat resistant polymer such as TEFLON. The insulators 56,58 restrict the conduction of thermal energy away from heated processing wall 68 to the cover and base, thereby allowing for the heat to be concentrated where required.

Wall 68 and the insulating rings 56,58 are secured between cover 64 and base 62 by four adjustable spacer assemblies 73. The assemblies are contained within the processing chamber 74. Each assembly includes a ceramic sleeve 76 and a nut fastener 78 at the top of cover 64 and a mating threaded portion in base 62 for cooperative attachment of a threaded stem 77. The assemblies 73 do not materially impede the projection of expelled product toward the processing wall 68.

Appropriate apparatus is connected to spinner head 60 for mating head 60 to a motor for permitting rotation of head 60 about axis A—A in a manner well known in the art. When spinner head 60 is supported from underneath, as shown in FIGS. 1B and 2B, base 62 further includes a stem 80 extending centrally downwardly. In applications where spinner head 60 is suspended below the drive motor, as shown in FIG. 10, stem 80 may extend upwardly from the cover 64 and attach to a motor shaft 32.

Figure 5:
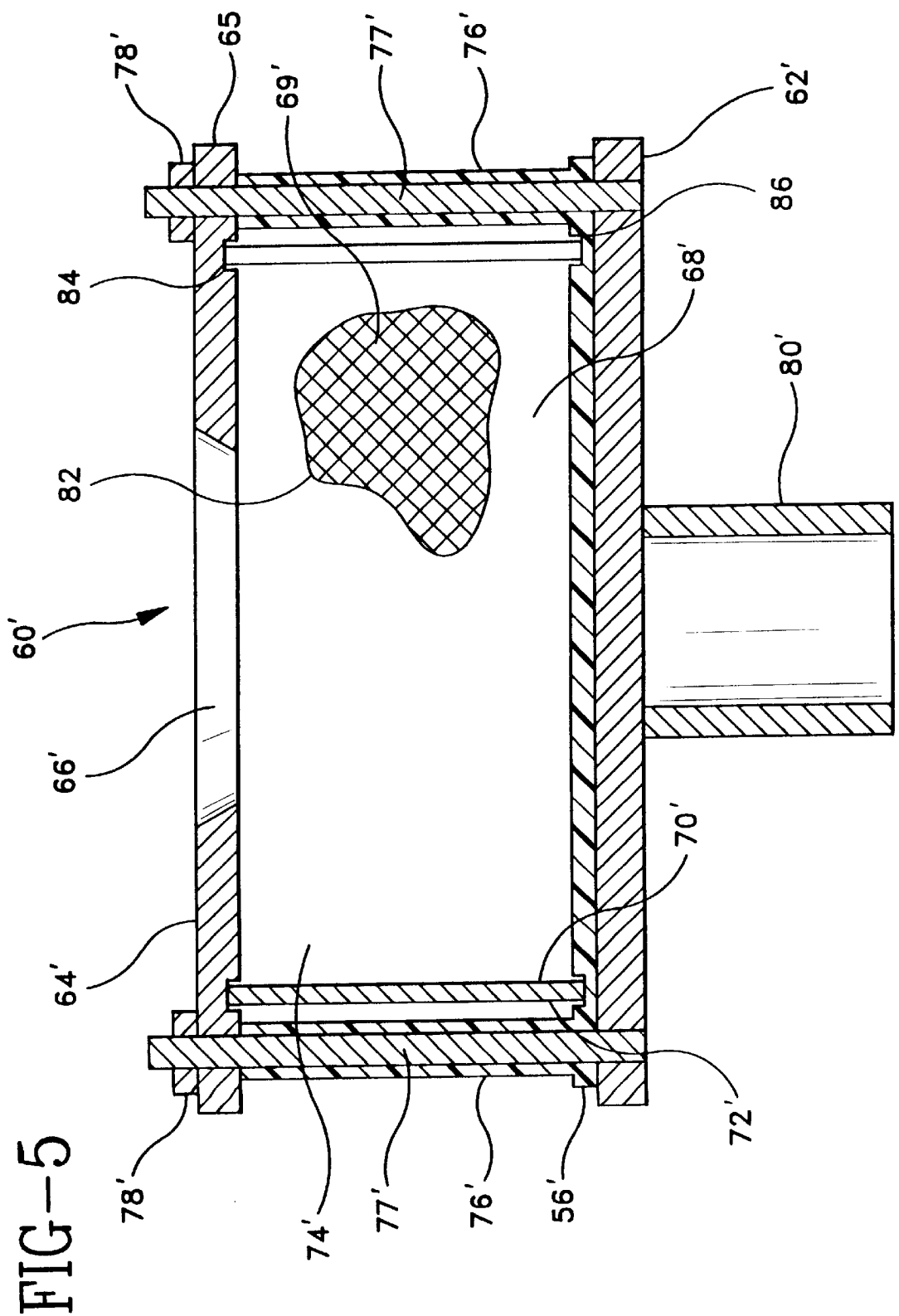
FIG. 5 is a vertical sectional view of an alternative embodiment of a spinner head of the present invention.

An alternative embodiment of spinner head 60' is shown in FIG. 5. Spinner head 60' includes a closed generally planar base 62' and a generally planar cover 64' aligned and spaced from base 62'. Cover 64' has an opening 66' to allow the introduction of feedstock material into head 60'. Spinner head 60' further includes a substantially cylindrical perimetrical processing wall 68' having an inner surface 70' and an outer surface 72'. Wall 68' is disposed between base 62' and cover 64' forming a chamber 74' for flash flow processing. The wall 68' has a pattern of openings 69' passing therethrough to allow the feedstock material to be expelled. A stem 80' extends centrally downwardly from the base 62' and includes a profile for mating with an appropriate mechanism such as a motor for permitting rotation of head 60' in a manner well known in the art. A base insulating ring 56' is disposed between base 62' and wall 68'. The cover 64' may be coated with a heat resistant polymer such as TEFLON.

In the alternative embodiment shown in FIG. 5, the ceramic sleeves 76' and threaded stems 77' are disposed outside processing chamber 74' and extend from a annular flange portion 65 of the cover into threaded portion of base 62'. Nut fasteners 78' are secured to the shafts 77' above annular flange portion 65.

It is within the contemplation of the present invention that the spinner head may be of any basic construction as known in the prior art.

The processing walls will now be more specifically described. As previously stated, the construction of processing wall and the size and shape of the openings 69 in wall 68 influence the morphology of the reformed product. This invention contemplates the use of various patterns of openings in order to produce a desired morphology. The pattern of openings in wall 68 may be of any one of the numerous configurations known in the art. Such shapes include vertical or circumferential slits, circular openings arranged in either vertical or circumferential rows. Various opening shapes are set forth in U.S. Pat. Nos. 5,458,823; 5,447,423; 5,445,769; and 5,427,881, as well as in copending and commonly assigned applications Ser. No. 08/854,344, filed May 12, 1997, now U.S. Pat. No. 5,834,033; and Ser. No. 08/874,215, filed Jun. 13, 1997, now U.S. Pat. No. 5,851,454, all of which are incorporated by reference herein. In addition, by providing a heat source external to the spinner head the openings and passages in the processing wall may take on many additional configurations that would not have been permitted with a spinner head based heating source.

Figure 4:
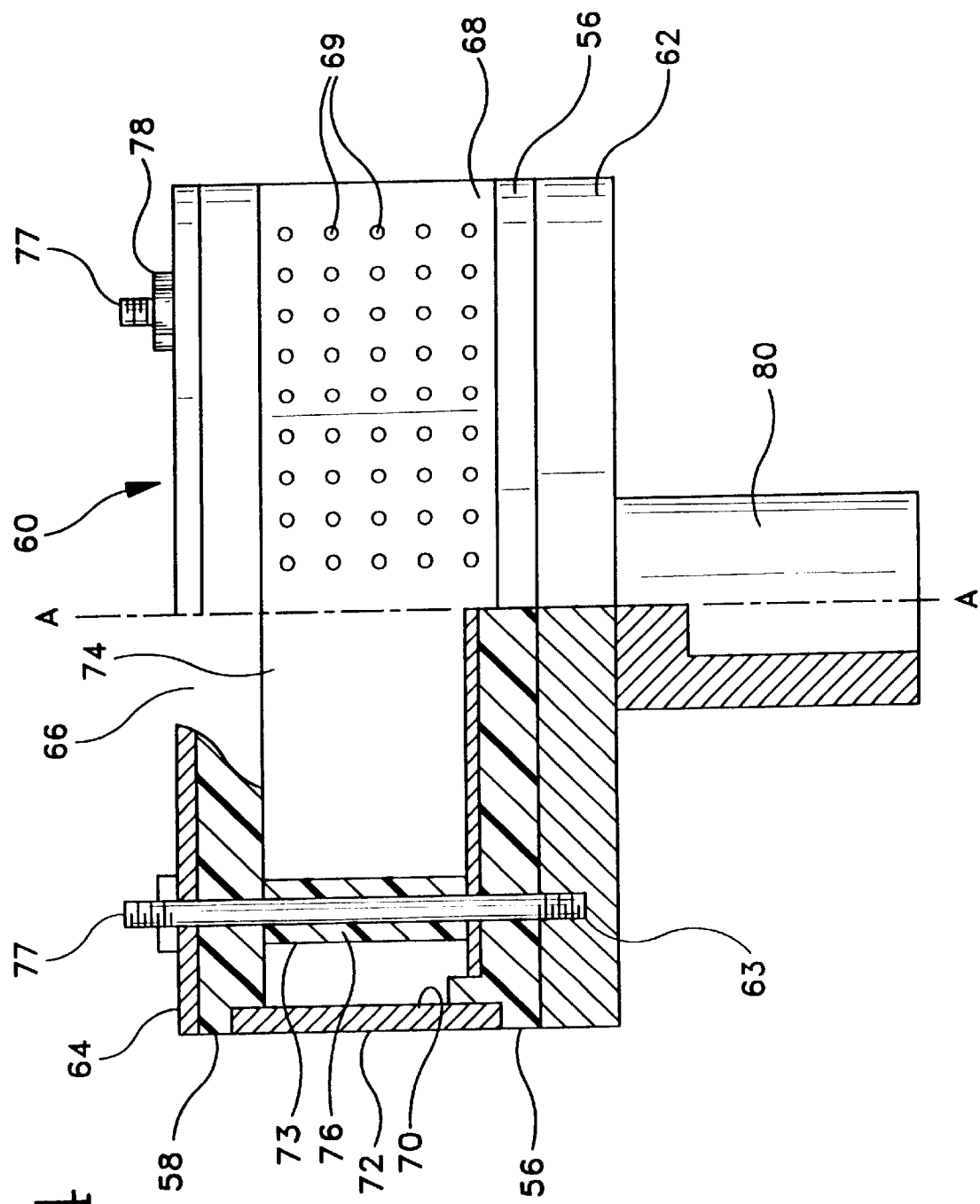
FIG. 4 is a partial cutaway view of the spinner head of FIG. 3 taken along line 4—4 thereof.

One embodiment of processing wall 68 is shown in FIG. 4. Wall 68 contains a plurality of openings 69 spaced in cylindrical rings about wall 68. The diameter of the openings is 0.020 inches, ±0.004 inches, and the distance between openings is 0.100 inch. Wall thickness is as small as structurally feasible, in order to provide the shortest heat exposure for the material while still maintaining sufficient path length in order to obtain the desired morphology. While these dimensions define one embodiment of the spinner head 60 of this invention, their inclusion is exemplary and not intended as a limitation. Openings 69 may also be formed by any means, e.g., by laser, drilling, etc. Openings 69 may also be cone shaped in cross-section relative to the inner and outer wall surfaces.

Another embodiment of a wall configuration now possible due to the use of an external heating surface is a wall 68' made substantially of only a wire mesh material 82 as shown in FIG. 5. The wire mesh forms numerous openings 69' through which the material may be expelled. Mesh 82 is preferably a metallic woven screen of between 30–120 mesh having fine holes or perforations therethrough. The top and bottom portion of mesh 82 sits within and is supported by annular grooves 84, 86 formed in the inner surfaces of cover 64' and base insulating ring 56' respectively. The rotation of head 60' forces feedstock material against and through mesh 82 creating the desired morphology of the reformed product.

Figure 6:
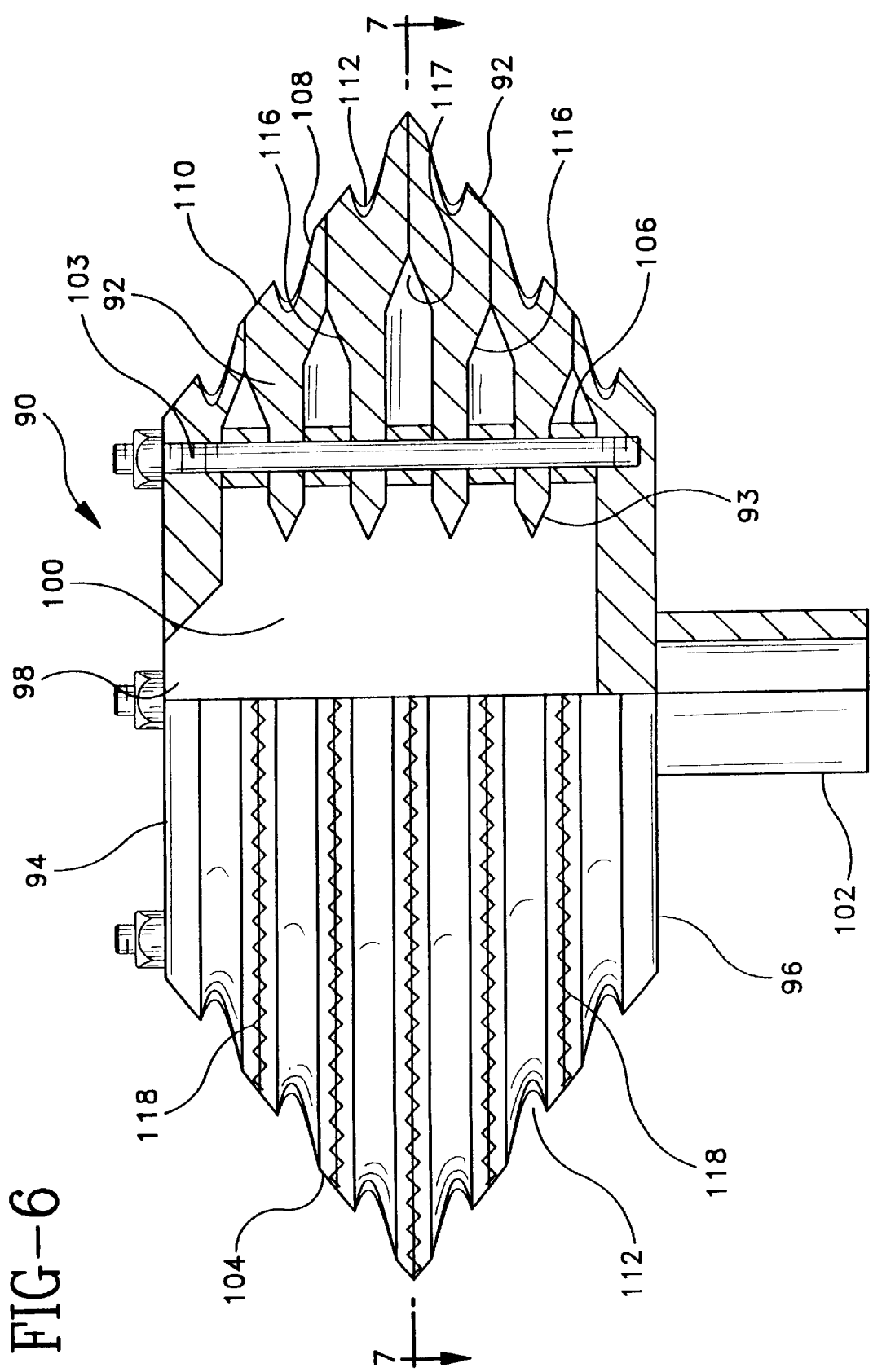
FIG. 6 is a partial cutaway view of the preferred embodiment of a spinner head of the present invention.

Now referring to FIG. 6, a preferred embodiment is shown of a spinner head which may be used with an external heat source. Spinner head 90 is preferably formed of a plurality of concentrically aligned stacked rings 92 secured together between a top and base plate 94, 96. Rings 92 form the material processing wall 104. Top plate 94 includes an aperture 98 for permitting feedstock material to enter an internal head chamber 100. Base plate 96 includes a stem 102 depending therefrom which provides a structure for coupling spinner head 90 to a motor (not shown). The rings 92 and top and base plates 94, 96 form chamber 100 which holds the feedstock material prior to its being expelled from the spinner head. Rings 92 preferably have a varying outside diameter portion such that when stacked together they form tapered processing wall 104 whose outside diameter diminishes as wall 104 extends axially away from an axial centerline. Such a tapered profile exposes a maximum amount of processing wall surface area to external heat source 40. Rings 92 are preferably formed of a thermally conductive material, such as stainless steel or aluminum, so that the heat energy imparted on the exposed portions of the rings will be conducted in toward chamber 100, thereby aiding in the processing of the feedstock material.

Referring additionally to FIGS. 7 and 8, each of rings 92 has a similar inside diameter dimension and are secured together by bolts 103 axially extending through annularly spaced radially inwardly extended lugs 97 formed on an inside diameter portion 93 of rings 92. The ring inside diameter portions 93 are separated by spacers 106 which assist in maintaining proper ring alignment.

Rings 92 are similarly configured although they have varying outside diameter dimensions in order to form a spinner head having a tapered processing wall. Accordingly, one ring will now be described in detail. Ring 92 is a generally Y-shaped member in cross-section having an inside diameter portion 93 which is substantially planar and to which ring 92 is secured to spinner head 90 as set forth above. Extending radially outwardly, ring 92 diverges into a first and second lip 108, 110 the first lip extending outwardly in the radial direction further than the second lip. Ring 92 is oriented within spinner head 90 such that the first lip 108, the longer of the two lips, is positioned toward the axial centerline of the spinner head 90 and the shorter lip positioned away therefrom. This orientation gives spinner head 90 its tapered profile. Between first and second lips 108, 110 is formed a generally U-shaped groove 112 which extends about the perimeter of ring 92.

Ring 92 further includes a plurality of radially extending annularly spaced grooves 114 formed on the axial outer surfaces of lips 108, 110. When lips of adjacently disposed rings engage each other, grooves 114 form channels 118 through which the feedstock material may flow from internal chamber 100 to outside head 90. In the preferred embodiment, rings 92 are so aligned such that a groove of one ring will be offset from a groove formed an opposed ring. Grooves 114 may have a variety of shapes and dimensions in order to produce a reformed product of desired morphology. The grooves may be formed as set forth in assignee's co-pending application Ser. No. 08/874,215 entitled "A Spinner Head Having Flow Resticting Inserts", now U.S. Pat. No. 5,851,454, the disclosure of which is incorporated by reference herein. For example, grooves may be V-shaped, U-shaped or square-shaped in cross-section.

In order to direct the feedstock material toward channels 118, ring 92 further includes tapered portions 116 extending from the upper and lower surface of the inside diameter to the lips. As shown in FIG. 6, tapered portions 116 of adjacently disposed rings form a V-shaped structure 117 leading toward the point where rings 92 abut and to the radially inward end of channels 118.

Spinner head 90 presents a processing wall having a surface area significantly greater than the substantially flat wall designs discussed above. Accordingly, such a design exposes a significant amount of surface to an adjacently disposed external heat source, and therefore, can absorb a significant amount of radiated energy. In order to maximize the energy absorption capabilities of spinner head 90, preferably two types of heat sources may be employed, as shown in FIG. 9.

Figure 9:
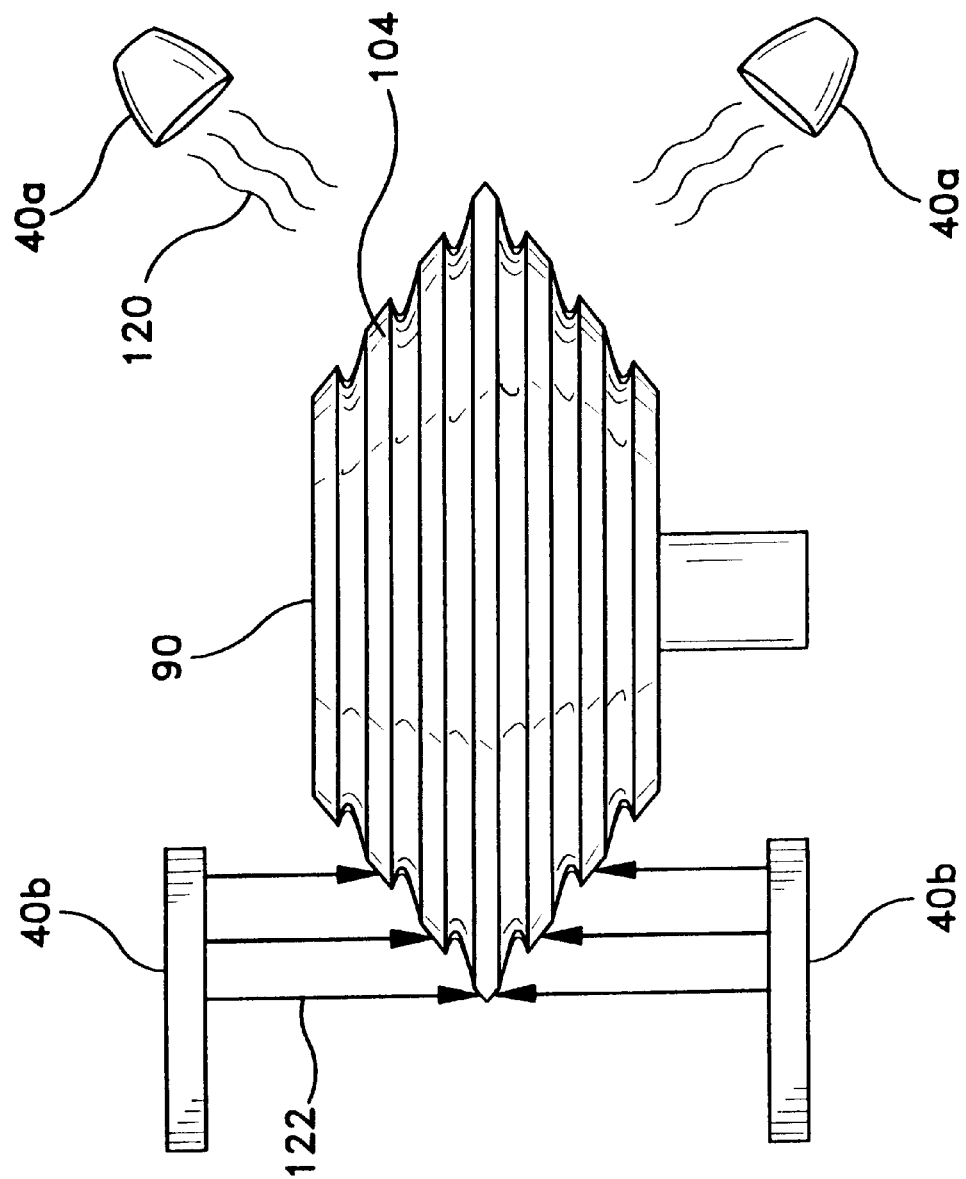
FIG. 9 is a side orthogonal view of the spinner head of FIG. 6 shown with external heating sources.

One type of external heat source shown in FIG. 9 provides a generalized wave of heat energy 120 directed toward the upper and lower portion of spinner head 90. Generalized wave producing heat sources 40a are preferably located such that the heat energy originates from a position generally perpendicular to the tapered processing wall 104. Such an alignment will expose the perpendicular portion of the processing wall to substantially direct rays of heat energy thereby maximizing the energy absorbed as well as providing a generally uniform heating of the processing wall. Heat energy generated by such sources as infrared lamps or microwave transmitters may be used to provide this generalized energy wave. Processing wall 104 may be heated either alternatively or additionally by a discrete pin-point producing heat source 40b in which energy 122 is specifically directed to portions of the processing wall adjacent the exit point of channels 118. Pin point control of energy may be generated by such devices as a laser or a narrow jet of hot air or steam.

In order to provide the external heat required for flash flow processing various heat sources are contemplated. In the embodiment shown in FIG. 1B, heat source 40 is mounted through an opening in the wall 17 of basin 16 such that the heat is in proximity to spinner head 60. The heat source 40 is preferably an infrared lamp designed to produce radiant thermal energy. Such lamps are of a type commercially available. A 650 watt lamp located adjacent to wall 68 could provide suitable heat for intraparticle flash flow if the melt temperatures were about 75 degrees or so.

A major advantage of infrared heating is the ability to heat a surface which intercepts the radiation without heating the air or other objects that surround the surface intended to be heated. The thermal energy may be focused and directed toward processing wall 68, 68', 104 thereby heating the entire wall as it spins in the path of the radiant energy. Since the spinner head has a relatively high angular velocity, the entire surface of processing wall 68, 68', 104 becomes substantially uniformly heated by the radiant energy of heat source 40. Uniform heating is important since product quality under certain circumstances is contingent upon maintaining temperatures within a finite temperature range. In addition, processing wall 68, 68', 104 is preferably formed of a thermally conductive material such as aluminum so that the heat will be uniformly distributed through wall processing thereby reducing the occurrence of hot or cool spots. The processing walls may also be formed of stainless steel or any other heat conductive material.

The surface of the processing wall 68, 68', 104 may be finished to have a dull flat appearance in order to increase the materials absorption of the infrared energy and increase the temperature of the wall. Alternatively, the aluminum wall may coated by an anodizing process with a pigmented finish in order to increase energy absorption. A steel wall could likewise be plated with a pigmented coating. It is also within the contemplation of this invention that by varying the finish, the wall temperature can be affected thereby influencing the morphology of the reformed product.

Figure 3:
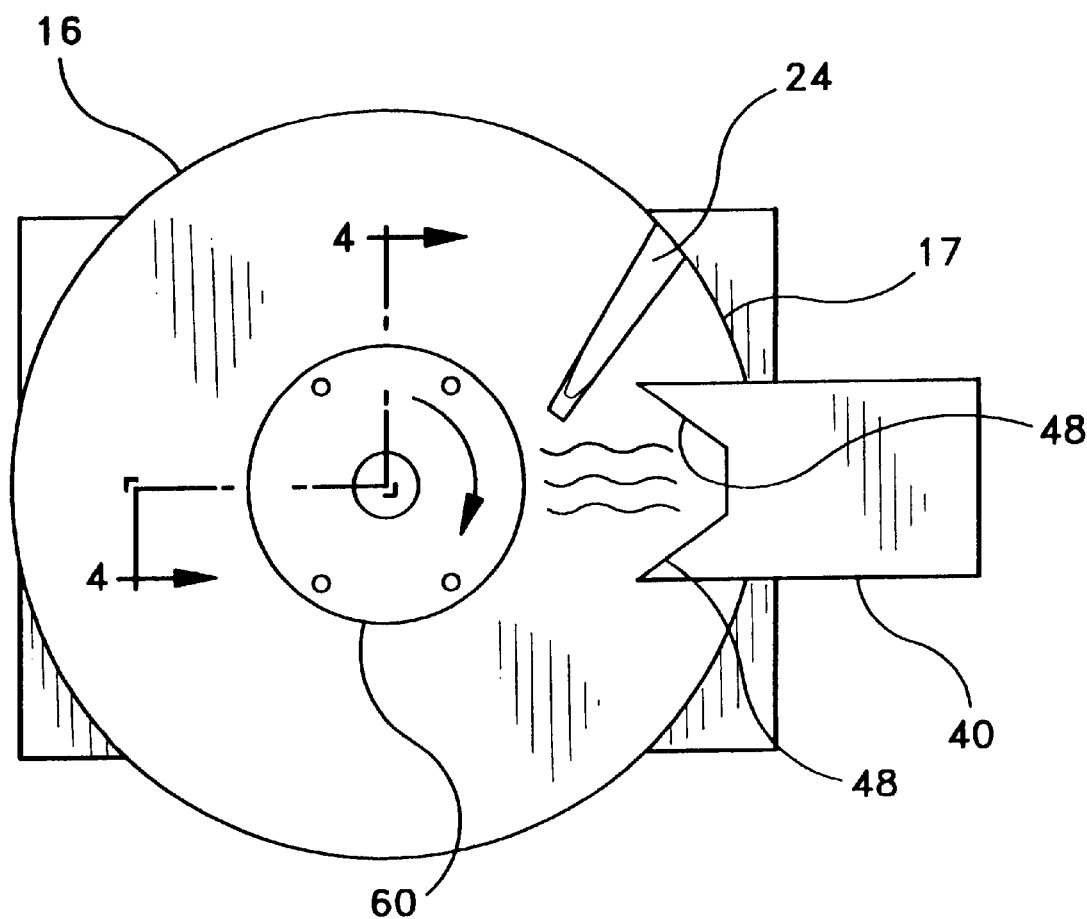
FIG. 3 is a sectional top plan view of the basin of FIG. 1B taken along line 3—3 thereof.

In order to intensify and direct the infrared radiation, reflectors 48 may be used as shown in FIG. 3. Such reflectors allow for the efficient use of energy as the radiant energy is focused on the location where heat is required, i.e. the outer wall surface of the spinner head.

In an alternative embodiment, the heat source may be a microwave transmitter providing radiant energy to heat the feedstock directly for flash flow processing. The microwave transmitter generates microwave radiation at a frequency so as to heat the material prior to expulsion from the head. Typically for food cooking applications the microwave frequency employed is 2450 ±50MHz. However, frequencies of 915 ±15 MHZ are also commonly used. Heating of the material is achieved by the absorption of microwave energy by rotation of water molecules and translation of the ionic components of the feedstock. In this embodiment the processing wall is preferably formed of a material which is transparent to microwaves, such as glass or plastics, thereby allowing the radiation to pass through to the feedstock. The feedstock adjacent the processing wall will become heated to flash flow temperatures, liquefy and then be expelled through the wall openings producing the reformed product of desired morphology.

Alternatively, the processing wall may be made of a material which absorbs the microwave radiation and can withstand the elevated temperatures required for flash flow conditions. In this embodiment the wall becomes heated and transfers its heat to the material as it contacts the wall. The heated material is then capable of undergoing intraparticle flash flow processing.

The present invention also contemplates the use of laser energy as a means of heating the wall to a point where intraparticle flash flow processing may take place. The beam being focused and directed to engage the spinner head processes wall at the point where the material exits the head. It has been found that for microsphere formation the morophology of the sphere can be effected by controlling the temperature of the material after it has exited the head. For example the laser could be aimed at exit points of channels 118 of spinner head 90 as described above to keep the material fluid longer before cooling. The rotation of processing wall will ensure that the exit point 118 are uniformly treated.

The heat may also be imparted on the various spinner head embodiment described herein by way of heated forced air stream. This heating means may be superior to other heating means for forming certain morphologies due to the air flow produced and its affect upon the expelled material. The forced hot air stream may be produced in any conventional matter. As shown in FIG. 10, a blower 42 moves air over heating elements 44 and exits at an elevated temperature from a nozzle 46 located adjacent spinner head 60, thereby heating wall 68. Heating elements are preferably electrical resistance coils although the air may be heated in any conventional manner. Nozzle 46 is shaped to direct the heated air stream 47 over the axial length of the spinner head.

Other sources of external heating are within the contemplation of the present invention including but not limited to light and other filament sources, resistance heaters, induction-based devices, frictional devices and concentrated solar energy.

The material expelled from spinner head 60 is projected radially outwardly in all directions by centrifugal force. This requires that the heat source be shielded from the expelled material in order to prevent material build up on the heat source which could both block the radiant energy as well as burn the material. In order to protect the heat source, a shield 24 is provided. As shown in FIG. 3, shield 24 is mounted to basin wall and extends toward spinner head 60. In an alternative embodiment shown in FIG. 1B, shield 24 is attached to the bottom surface of basin adjacent to the spinner head and in between the head and the heat source. Another alternative embodiment would include the use of an air knife to assist in keeping reformulated product from building up on the heat source. An air knife consist of a stream of air that flows across the face of the heat source thereby preventing material buildup as well as removing the material once it engaged the heat source. The air stream could be continuous stream or an intermittent blast and activated only as required. A further alternative would be to mount the heat source 40 out of the material flow path as shown in FIGS. 2A and 2B.

The problem of reformed material coating the heat source is not present in the forced air method of generating the required heat since the forced air exiting nozzle 46 prevents the expelled material from blocking the path of the heat.

Thus, while there had been described what are the presently believed to be the preferred embodiments of the present invention, other and further modifications and changes can be made thereto without departing from the true spirit of the invention. It is intended to include all further and other modifications and changes which come within the true scope of the invention as set forth in the claims.

What is claimed:

1. A material processing apparatus for processing a solid feedstock material through a flash heat spin process comprising:
    a spinner head including a spinner head chamber defined by a perimetrical processing wall through which said solid material is processed;
    means for rotating said spinner head about an axis of rotation to cause said feedstock material to be propelled toward and through said processing wall; and
    heating means separate from and exterior to said spinner head for heating said feedstock material to an elevated temperature to cause said flash heat spin processing as said feedstock material is projected through said processing wall.

2. The material processing apparatus of claim 1 wherein said heating means is adjacent to said processing wall and heats said processing wall to an elevated temperature sufficient to cause said flash heat spin processing of said feedstock material propelled therethrough.

3. The material processing apparatus of claim 1 wherein said heating means is in spaced apart proximity to said processing wall and heats said feedstock material within said spinner head to an elevated temperature sufficient to cause said flash heat spin processing of said feedstock material as it is propelled therethrough.

4. The material processing apparatus of claim 1 wherein said heating means includes an external heater positioned adjacent said spinner head.

5. The material processing apparatus of claim 2 wherein said heating means includes an external heat positioned adjacent said spinner head for heating said processing wall upon said rotation of said spinner head.

6. The material processing apparatus of claim 5 wherein said external heat source is a convection heater.

7. The material processing apparatus of claim 2 wherein said external heat source comprises a source of forced hot air.

8. The material processing apparatus of claim 2 wherein said external heating means comprises a source of radiant energy.

9. The material processing apparatus of claim 8 wherein said external heating means is an infrared heater.

10. The material processing apparatus of claim 3 wherein said external heat means is a microwave generator.

11. The material processing apparatus of claim 10 wherein said processing wall is formed of a microwave transparent material and said microwave generator heats said feedstock material directly.

12. The material processing apparatus of claim 10 wherein said processing wall is formed of a microwave material which is capable of absorbing microwaves and said microwave generator heats said processing wall which then heats said feedstock material as it passes through said wall.

13. The material processing apparatus of claim 2 wherein said external heating means comprises a source of laser energy.

14. The material processing apparatus of claim 1 wherein said spinner head further includes a base;
    a cover aligned and spaced from said base, said processing wall disposed between said cover and base forming said chamber;
    a means for securing said cover, base and wall together;
    said base having a means for securing said base to said rotating means; and
    said cover further including an opening to allow the introduction of said feedstock material into said chamber.

15. The material processing apparatus of claim 1 wherein said processing wall includes a plurality of openings.

16. The material processing apparatus of claim 15 wherein said processing wall is formed of wire mesh.

17. The material processing apparatus of claim 1 wherein said processing wall is formed by a plurality of substantially concentrically stacked rings, each of said rings having a plurality of radially extending grooves through which said feedstock may flow.

18. The material processing apparatus of claim 17 wherein said spinner head processing wall has a varying diameter with said diameter diminishing as said wall extends axially away from an axial centerline.

19. The material processing apparatus of claim 18 wherein each ring has a radial outer portion including a first lip and a second lip, said first lip extends radially outwardly further than said second lip and wherein each of said rings is positioned such that said first lip is positioned toward said axial centerline.

20. The material processing apparatus of claim 19 wherein said grooves are formed on an axial outer surface of either one of said first and second lips.

21. A material processing apparatus for flash heat spin processing of a solid feedstock material comprising:
    a spinner head including a spinner head chamber defined by a perimetrical processing wall through which said solid material is processed, said wall being formed of a plurality of stacked concentrically aligned rings, said rings having a plurality of axially extending grooves providing channels through which said feedstock material may exit said chamber;
    means for rotating said spinner head about an axis of rotation to cause said feedstock material to be propelled toward and through said processing wall; and
    heating means separate from and exterior to said spinner head for heating said feedstock material to an elevated temperature to cause said flash heat spin processing as said feedstock material is projected through said processing wall.

22. A method of processing feedstock material comprising the steps of:
- providing a spinner head having a chamber bounded by a material processing wall through which said material is processed;
- introducing said feedstock material into said chamber;
- spinning said spinner head to propel said feedstock material toward and through said processing wall; and
- heating said feedstock material from a heating means disposed external to said spinner head to an elevated temperature sufficient to cause processing of said material at said processing wall to produce a desired morphology in said feedstock material.

23. The method of claim 22 wherein said heating step further includes:
- heating said processing wall as said feedstock material is forced toward and through said processing wall.

24. The method of claim 22 wherein said heating step further includes:
- heating said material prior to said feedstock material contacting said processing wall.

25. The method of claim 22 wherein said heating means includes an infrared lamp.

* * * * *